Aug. 9, 1949.   A. G. CARTER, SR., ET AL   2,478,458
BAKING APPARATUS
Filed March 16, 1948   2 Sheets-Sheet 1
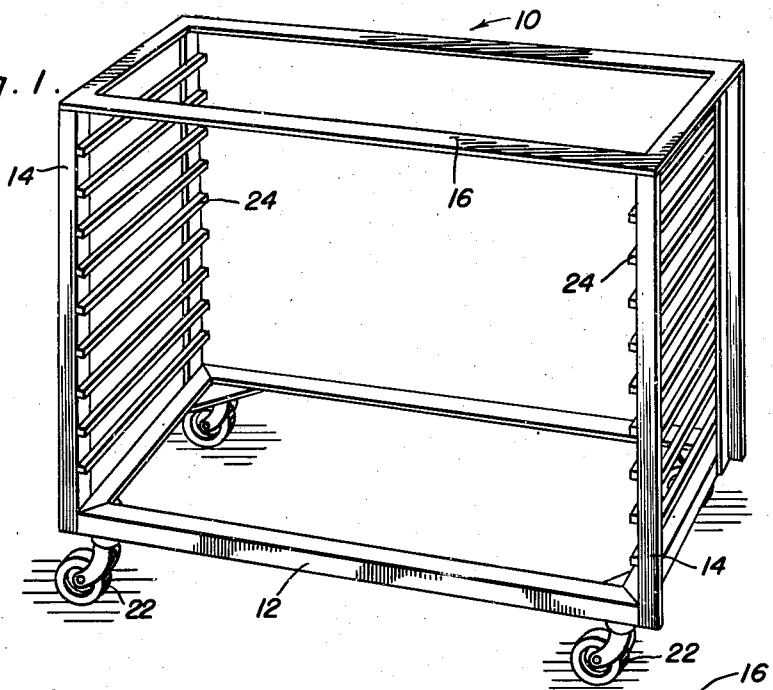
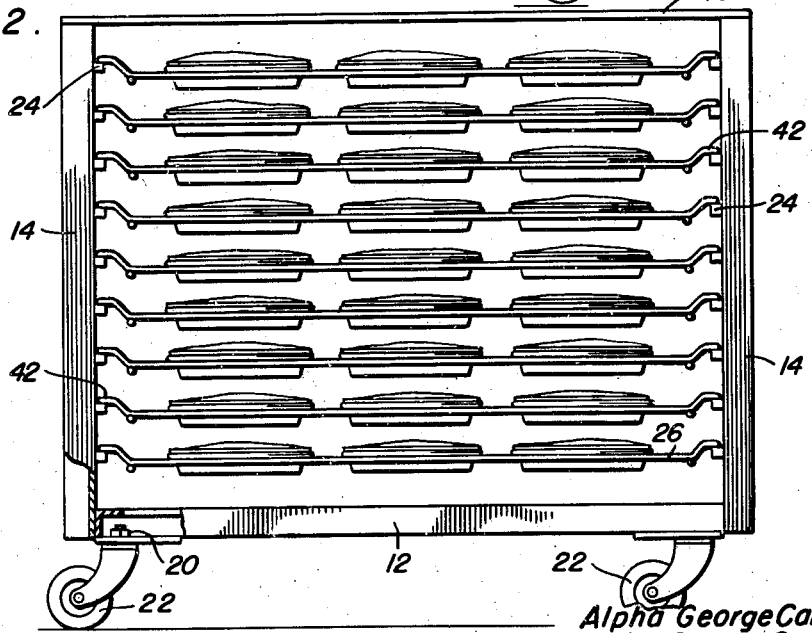
Alpha George Carter, Sr.
Alpha George Carter, Jr.
INVENTORS Aug. 9, 1949.  A. G. CARTER, SR., ET AL  2,478,458
BAKING APPARATUS
Filed March 16, 1948  2 Sheets-Sheet 2
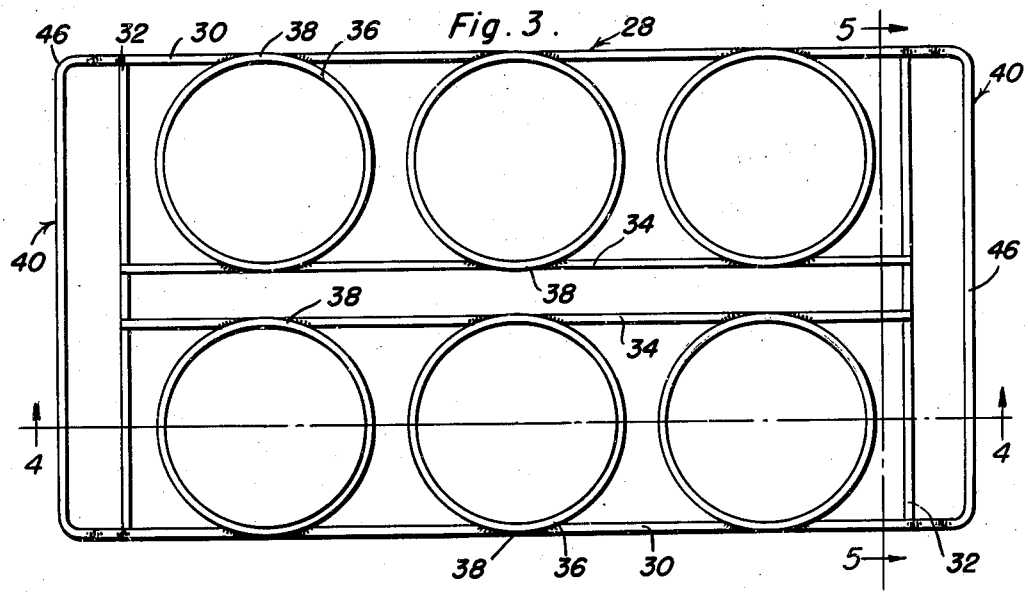
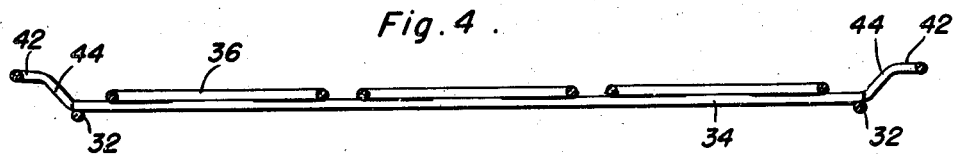
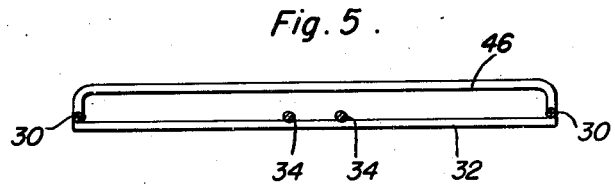
Alpha George Carter, Sr.
Alpha George Carter, Jr.
INVENTORS Patented Aug. 9, 1949

2,478,458

UNITED STATES PATENT OFFICE 2,478,458

BAKING APPARATUS

Alpha George Carter, Sr., and Alpha George Carter, Jr., Kansas City, Mo.

Application March 16, 1948, Serial No. 15,114

2 Claims. (Cl. 211—126)

This invention relates to an apparatus for transporting a large number of pies to the baking oven and has for its primary object the elimination of the unnecessary handling of the pies individually, often resulting in wasteful breakage and spoilage.

The conventional apparatus used in connection with pie baking necessitates the use of two men to load an oven, one using the peel or paddle and one loading pies on the peel. This is time-consuming and wasteful, since pies are often dropped or otherwise marred. By the use of the present invention, these disadvantages are entirely removed, since only one man is necessary, which man accomplishes more in less time than the two men. For each man-hour used in loading the pies in the oven, approximately one-man hour is saved by the instant invention.

Another object of the invention is the provision of a rack which may be easily wheeled to the oven and which slidably and removably supports trays having apertures in which the conventional pie pans can be hung. The means for supporting the apertured trays on the wheeled rack are at the same time handle means for lifting the trays off the rack and placing them together with the supported pies in the oven. After the pies are baked, the trays can be readily removed from the oven by these same handles and placed on the rack to be transported away from the oven. The rack is made to support a plurality of apertured pie-supporting trays. Once the pies are placed on the rack, there is no further handling of them until the pies are ready for sale. Increased sanitation and decreased loss due to damage by excessive handling are, therefore, effected. In addition, the racks effect a saving in space and porter work, as the wire trays serve as shelves as well as being baking instruments.

A further object of the invention is to provide a tray having circular apertures and annular raised rims about these apertures whereby the conventional pie pans together with the pies may be placed in the apertures and easily and removably supported thereon by the rims.

Another object of this invention is to provide wire trays so constructed as to fit the baker's needs as to oven space and the size of his pie tins. The wire trays are formed in such manner that they may be readily and easily slipped in and out of a rack at the convenience of the baker. When the trays are in the oven, they serve as an instrument of baking; when they are removed from the oven and put back on the rack, they serve as shelves where the pies will remain until ready to be put up for orders. This use of the tray as a shelf also serves to cool the pies much more quickly and uniformly, by allowing the air to circulate around the entire pie preventing the formation of a soggy bottom crust.

These, together with various ancillary objects and features of the invention which will later become apparent as the following description proceeds, are attained by the device, a preferred embodiment of which has been illustrated by way of example only in the accompanying drawings, wherein:

Figure 1 is an isometric view of the wheeled rack;

Figure 2 is a side elevational view of the rack with the pie-carrying trays supported thereon and partly in section;

Figure 3 is a top plan view of the tray itself without pies thereon;

Figure 4 is a longitudinal sectional view taken substantially on the plane of section line 4—4 of Figure 3; and Figure 5 is a transverse sectional view taken substantially on the plane of section line 5—5 of Figure 3.

Specific reference is now made to the drawings. In the several views in the accompanying drawings and in the following specification, similar reference characters indicate corresponding elements throughout.

Generally indicated at 10 is a wheeled rack of preferably oblong shape consisting of a rectangular base member 12 which is constructed of angle irons welded at their corners. Welded or riveted to the transverse sides of the base 12 are four uprights 14, also in the form of angle irons, to the top of which is welded or riveted a top rectangular hollow pallet or frame 16.

Suitably secured to the corners of the base 12, as by screws or bolts and nuts 20, are four conventional caster-type wheels 22. Extending transversely of the wheeled rack 10 and suitably secured to the uprights 14, as by welding, riveting or the like, are a plurality of spaced parallel tray supporting members in the form of rods or bars 24. Slidably and removably supported on these bars are a plurality of apertured pie-supporting trays 26, the construction of which is set forth more particularly in Figures 3–5.

Each tray consists of a generally rectangular peripheral rod or bar 28 fabricated of steel or light weight metals having spaced parallel longitudinal members 30 and transverse members 32. Welded to the transverse members 32 intermediate their ends and substantially at the center of the tray, a pair of spaced parallel longitudinal rods or bars 34 are provided. A plurality of annular or circular rims or rings 36 are provided which are supported on the tray by welding them to the longitudinal bars 28 and 34, as at 38.

Welded or riveted to the transverse members 32 are a pair of angulated transverse lips 40 which consist of a horizontal portion 42, which portion is suspended on the supports 24, and an integral downwardly and inwardly inclined vertical portion 44. Like the remainder of the tray, the lips 40 are in effect hollow, since each entire lip consists of a unitary peripheral bar or rod 46. This bar or rod is bent to produce the portions 42 and 44.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. An apparatus for use in baking comprising a wheeled rack, a plurality of spaced parallel supports carried by said rack, and pie-supporting trays slidably and removably suspended on said supports, each of said trays comprising a substantially rectangular wire frame including side and end members, substantially U-shaped wires having inclined angulated legs secured at their ends to said end members and adapted to engage said supports, a pair of spaced rods secured at their opposite ends to said end members and extending parallel to said side members, and spaced pie-supporting rims secured between said rods and said side members.

2. In a wheeled rack having support bars; a pie-supporting tray comprising a substantially rectangular wire frame including side and end members, substantially U-shaped wires having inclined angulated legs secured at their ends to said end members and adapted to engage said supports, a pair of spaced rods secured at their opposite ends to said end members and extending parallel to said side members, and spaced pie-supporting rims secured between said rods and said side members.

ALPHA GEORGE CARTER, Sr.
ALPHA GEORGE CARTER, Jr.

REFERENCES CITED

The following references are of record in the file of this patent:

UNITED STATES PATENTS

| Number | Name | Date |
|---|---|---|
| 1,072,000 | Golden | Sept. 2, 1913 |
| 1,351,387 | Jesse | Aug. 21, 1920 |
| 2,025,896 | Reedy | Dec. 31, 1935 |
| 2,092,963 | Fehr | Sept. 14, 1937 |
| 2,138,560 | Stuart | Nov. 29, 1938 |